United States Patent
Hantani (10) Patent No.: US 11,498,188 B2
(45) Date of Patent: Nov. 15, 2022

(54) GRIPPING TOOL

(71) Applicant: SIMIAN LTD., Gujo (JP)

(72) Inventor: Shigeyuki Hantani, Gujo (JP)

(73) Assignee: SIMIAN LTD., Gujo (JP)

( * ) Notice: Subject to any disclaimer, the term of this patent is extended or adjusted under 35 U.S.C. 154(b) by 0 days.

(21) Appl. No.: 17/439,552

(22) PCT Filed: Jul. 15, 2020

(86) PCT No.: PCT/JP2020/027540
§ 371 (c)(1),
(2) Date: Sep. 15, 2021

(87) PCT Pub. No.: WO2021/010423
PCT Pub. Date: Jan. 21, 2021

(65) Prior Publication Data
US 2022/0088750 A1 Mar. 24, 2022

(30) Foreign Application Priority Data

Jul. 17, 2019 (JP) .............................. JP2019-131637

(51) Int. Cl.
*B25B 9/02* (2006.01)
*A22C 25/16* (2006.01)
(Continued)

(52) U.S. Cl.
CPC .............. *B25B 9/02* (2013.01); *A22C 25/166* (2013.01); *A45D 26/0066* (2013.01); *A47J 43/28* (2013.01)

(58) Field of Classification Search
CPC ..... B25B 9/02; A22C 25/166; A45D 26/0066; A47J 43/28
See application file for complete search history.

(56) References Cited

U.S. PATENT DOCUMENTS 1,701,995 A * 2/1929 Russellm ............... A61B 17/30
606/210
3,815,609 A * 6/1974 Chester .................. A61B 17/30
606/210
(Continued)

FOREIGN PATENT DOCUMENTS

EP 0010693 A1 5/1980
JP H05-11911 U 2/1993
(Continued)

OTHER PUBLICATIONS

International Search Report of the International Searching Authority in related application PCT/JP2020/027540, dated Oct. 10, 2020, 2 pages.
(Continued)

*Primary Examiner* — Stephen A Vu
(74) *Attorney, Agent, or Firm* — Bochner IP, PLLC; Andrew D. Bochner (57) ABSTRACT

A gripping tool includes first and second arms connected to each other at proximal ends, a first gripping portion having a first gripping surface, and a second gripping portion having a second gripping surface. The first and second gripping surfaces are in planar contact with each other when the first and second arms are pressed toward each other in closing directions. At least one of the first and second gripping portions is an elastic part extending toward the proximal end. When the first and second arms are further pressed in the closing directions from a state in which the first and second gripping surfaces are in planar contact with each other, the elastic part is elastically deformed while maintaining the planar contact between the first gripping surface and the second gripping surface.

7 Claims, 4 Drawing Sheets

(51) Int. Cl.
*A45D 26/00* (2006.01)
*A47J 43/28* (2006.01)

(56) References Cited

U.S. PATENT DOCUMENTS

| | | | | |
|---|---|---|---|---|
| 4,330,936 A | * | 5/1982 | Swarth | A61J 7/0007 225/103 |
| 5,088,667 A | * | 2/1992 | Olson | B65F 1/1415 248/101 |
| 2015/0230884 A1 | * | 8/2015 | McDonald | A61B 17/30 433/157 |

FOREIGN PATENT DOCUMENTS

| | | |
|---|---|---|
| JP | H06-52806 U | 7/1994 |
| JP | H06-75416 U | 10/1994 |
| JP | 3134082 U | 8/2007 |
| JP | 3178053 U | 8/2012 |
| JP | 2017-192458 A | 10/2017 |
| JP | 2019-146954 A | 9/2019 |

OTHER PUBLICATIONS

Written Opinion of the International Searching Authority in related application PCT/JP2020/027540, dated Oct. 10, 2020, 3 pages.
Extended Search Report of the European Patent Office in related Appl. No. 20840887.2, dated Feb. 18, 2022, 7 pages.

* cited by examiner

GRIPPING TOOL

TECHNICAL FIELD

The present disclosure relates to a gripping tool.

BACKGROUND ART

Patent Documents 1 to 4 disclose gripping tools for holding objects to be gripped. Hair tweezers and tweezers for thorns are examples of gripping tools.

A gripping tool of Patent Document 1 includes two elastic gripping parts. One of the two gripping parts has a flat first gripping surface, and the other has a second gripping surface having a smaller area than the first gripping surface.

Patent Document 2 discloses a pair of tweezers as a gripping tool that includes first and second arms elastically connected to each other at their proximal ends. The first and second arms have first and second gripping portions, respectively, at their distal ends. The first and second arms have a convex cross-sectional shape to obtain sufficient strength. Additionally, the first arm includes first and second guide parts projecting toward the second arm, and the second arm includes first and second guide portions projecting toward the first arm. When the guide parts and the guide portions engage with one another, the gripping portions hold a gripping object in a "proper state." The guide parts and the guide portions also serve as stoppers that come into contact with the inner surfaces of the second and first arms. The "proper state" refers to a state in which the stoppers stop the two gripping portions from separating from each other. The rigidity of each gripping portion is reinforced by a reinforcing plate. As such, the gripping portion itself does not have elasticity.

Patent Document 3 discloses a pair of tweezers as a gripping tool that includes two arm parts and a connecting portion that elastically connects the two arm parts. Each arm part has a pinching portion at its distal end. One of the two arm parts includes a reinforcing plate extending over its entire length, and the other has two gripping plates each extending over approximately a half of the entire length. When the two arm parts are pressed toward each other, the reinforcing plate is inserted between the two gripping plates, and reinforcing walls reinforce the gripping plates. This provides a sufficient rigidity even when the tweezers are made of synthetic resin.

Patent Document 4 discloses a pinching tool as a gripping tool that includes a support portion and two action portions extending from the support portion. Each action portion has a through-hole or a cutout section near its distal end.

PRIOR ART DOCUMENTS

Patent Documents

Patent Document 1: Japanese Laid-Open Patent Publication No. 2017-192458
Patent Document 2: Japanese Laid-Open Utility Model Publication No. 6-52806
Patent Document 3: Japanese Laid-Open Utility Model Publication No. 6-75416
Patent Document 4: Registered Utility Model No. 3178053

SUMMARY OF THE INVENTION

Problems that the Invention is to Solve

Figures 8A, 8B:
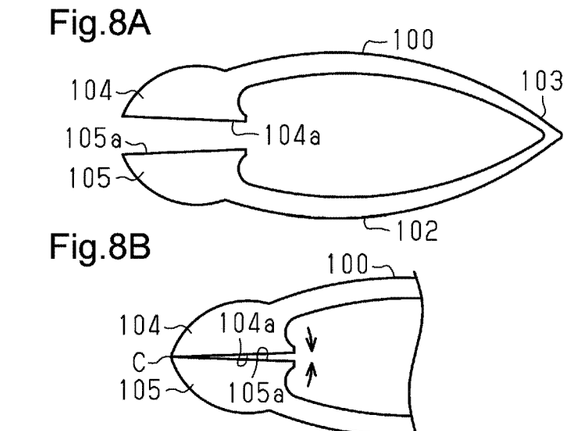
FIGS. 8A to 8D are side views illustrating a conventional gripping tool.

Referring to FIGS. 8A to 8D, a pair of hair tweezers, which is a typical gripping tool, is now described. As shown in FIG. 8A, a typical pair of hair tweezers includes two elastic arms 100 and 102, a connecting portion 103 elastically connecting the proximal ends of the arms 100 and 102 to each other, and gripping portions 104 and 105 located at the distal ends of the respective arms 100 and 102. The gripping portions 104 and 105 have flat gripping surfaces 104a and 105a, respectively. The gripping surfaces 104a and 105a face each other.

Figure 8C:
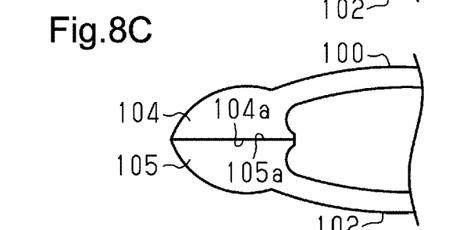

As shown in FIG. 8A, when the arms 100 and 102 are not pressed, the gripping portions 104 and 105 are spaced apart from each other. As shown in FIG. 8B, when the arms 100 and 102 are pressed in the closing directions, the connecting portion 103 is elastically deformed, and the distal ends of the gripping surfaces 104a and 105a come into contact with each other. As shown in FIG. 8C, when the arms 100 and 102 are further pressed in the closing directions, the entire gripping surfaces 104a and 105a come into planar contact with each other.

Figure 8D:
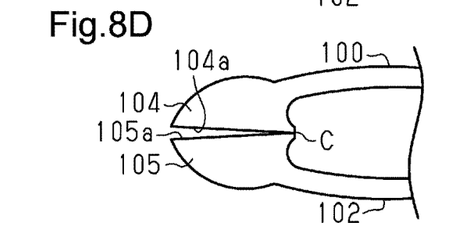

As shown in FIG. 8D, when the arms 100 and 102 are further pressed in the closing directions, the gripping surfaces 104a and 105a are in contact with each other at their rear ends. This occurs for the following reason.

The arms 100 and 102 are connected to the gripping portions 104 and 105, respectively. After the arms 100 and 102 are pressed in the closing directions and the distal ends of the gripping surfaces 104a and 105a come into contact with each other as shown in FIG. 8B, the distal ends where the gripping portions 104 and 105 are in contact function as a fulcrum point in the range in which the arms 100 and 102 can be elastically deformed. Thus, a moment acts on the gripping portions 104 and 105 about the fulcrum point C. This brings the gripping surfaces 104a and 105a into planar contact as shown in FIG. 8C.

As the arms 100 and 102 are further pressed in the closing directions, the fulcrum point C moves toward the proximal ends of the gripping surfaces 104a and 105a in the range in which the arms 100 and 102 can be elastically deformed. When a moment acts on the gripping portions 104 and 105 about this fulcrum point, the distal ends of the gripping surfaces 104a and 105a are separated from each other as shown in FIG. 8D.

As a result, the gripping surfaces 104a and 105a cannot hold short hairs that do not reach the proximal ends of the gripping portions 104 and 105. This is the first problem.

Furthermore, the proximal ends of the gripping portions 104 and 105 may pinch and cut long hairs extending beyond the proximal ends of the gripping portions 104 and 105 toward the connecting portion 103. This is the second problem.

Patent Document 1 does not have the first problem because the front ends of the gripping surfaces do not open when holding a gripping object. However, since the second gripping surface is smaller in area than the first gripping surface, stress is concentrated on the part in contact with the gripping object. The part of the gripping object held by the second gripping surface may break depending on its material. Patent Document 1 therefore fails to solve the second problem.

Patent Document 2 discloses, as an example that is not in a "proper state," that the front ends of the gripping portions are not properly in contact with each other when there are clearances between the inner surfaces of the arms and the guide portions and the guide parts. Patent Document 2 presumably solves the first problem because the stopper provides a "proper state."

However, although not described in Patent Document 2, if sections of the arms between the stoppers and the gripping portions are further pressed in the closing directions, the front ends of the gripping portions may fail to be properly in contact with each other. In this case, the second problem is not solved.

Additionally, with Patent Document 2, it is difficult to set the guide portions and the guide parts to come into contact with the inner surface of the corresponding arm. For example, the thickness of the gripping object determines the distance between the gripping portions holding the gripping object. For this reason, the "proper state" is not necessarily achieved with every gripping object.

Patent Documents 3 and 4 fail to disclose specific methods for solving the first problem and the second problem.

It is an objective of the present disclosure to provide a gripping tool that is capable of, when a gripping object is held between gripping portions, limiting the opening between the front ends of the gripping portions and also limiting breaking of the gripping object held between the gripping portions.

Means for Solving the Problems

In accordance with one aspect of the present disclosure, a gripping tool includes first and second arms connected to each other at proximal ends thereof, a first gripping, a first gripping portion at a distal end of the first arm, the first gripping portion having a first gripping surface, and a second gripping portion at a distal end of the second arm, the first gripping portion having a second gripping surface. The first and second arms are configured such that the first and second gripping surfaces are in planar contact with each other when the first and second arms are pressed in closing directions toward each other. At least one of the first and second gripping portions is an elastic part extending toward the proximal end. The elastic part is configured to, when the first and second arms are further pressed in the closing directions from a state in which the first and second gripping surfaces are in planar contact with each other, be elastically deformed while maintaining the planar contact between the first gripping surface and the second gripping surface.

MODES FOR CARRYING OUT THE INVENTION

First Embodiment

Referring to FIGS. 1 to 6B, a gripping tool 10 of a first embodiment according to the present invention is now described. The gripping tool 10 can be used for any of the purposes of plucking hairs, thorns, or fine fish bones, but is not limited to these applications. As defined herein, the directions of front, rear, right, and left are based on a state in which the user holds the gripping tool 10 and its distal end (front end) is directed forward. Furthermore, the directions perpendicular to the front-rear directions and the right-left directions are up-down directions. In the present embodiment, a first arm 12, which will be described below, is located above a second arm 14.

Figure 1:
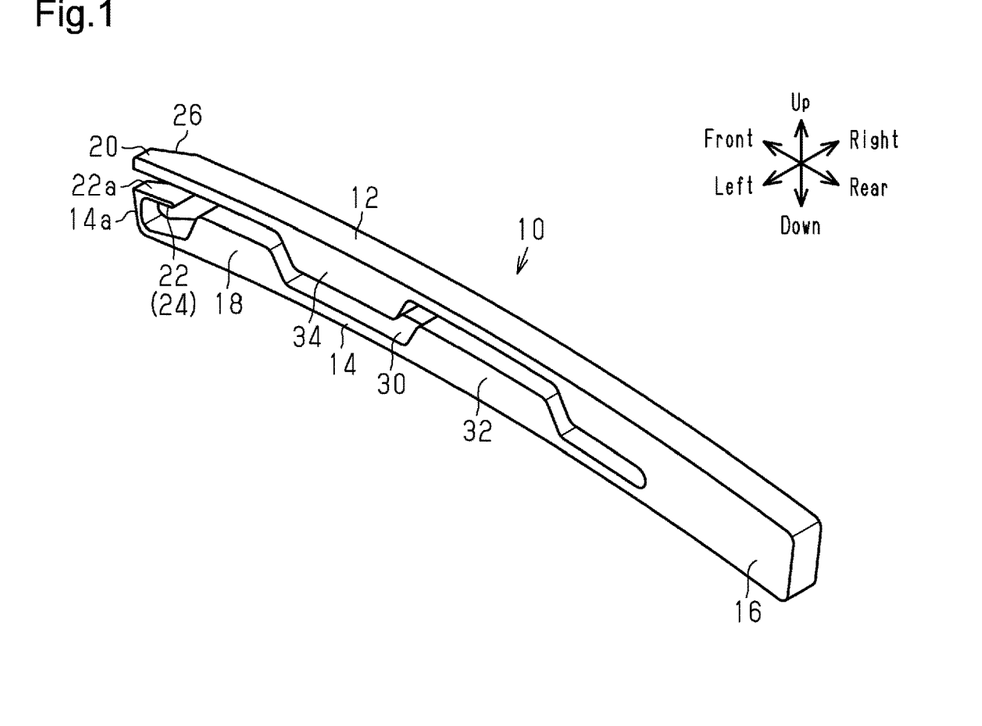
FIG. 1 is a perspective view of a gripping tool according to a first embodiment.
Figure 4A:
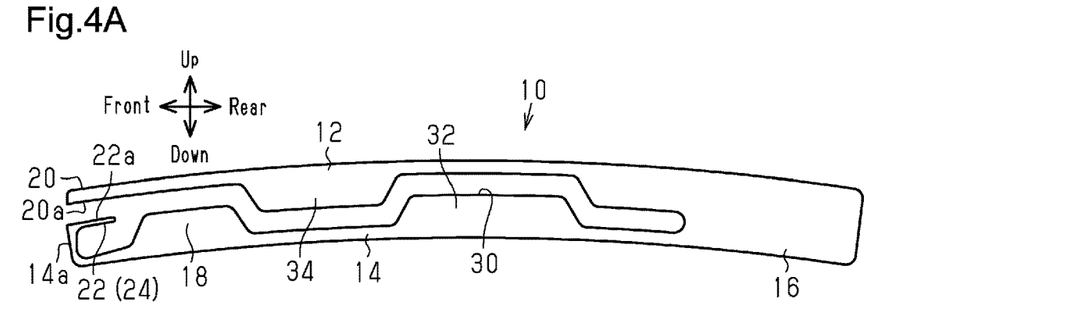
FIG. 4A is a left side view of the gripping tool of FIG. 1.
Figure 4B:
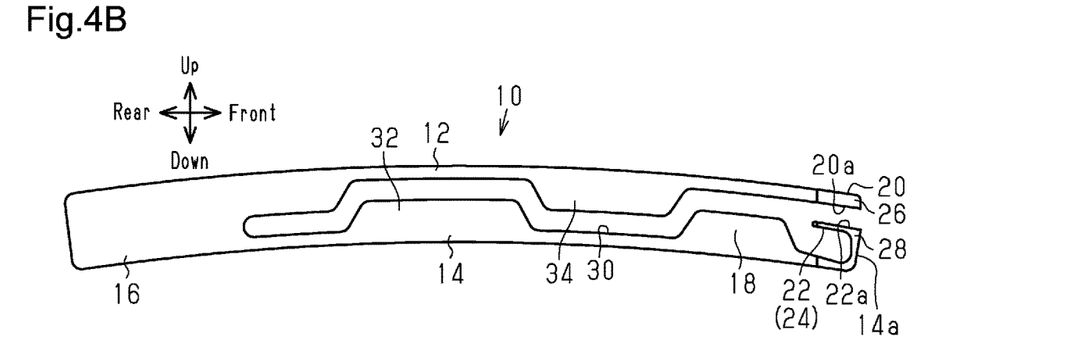
FIG. 4B is a right side view of the gripping tool of FIG. 1.

As shown in FIGS. 1, 4A, and 4B, the gripping tool 10 includes the first arm 12 and the second arm 14. A proximal end (rear end) of the first arm 12 and a proximal end (rear end) of the second arm 14 are elastically connected to each other. A portion where the arms are connected is a connecting portion 16. A distal end (front end) of the first arm 12 and a distal end (front end) of the second arm 14 are free ends. The distal end of the first arm 12 and the distal end of the second arm 14 include a first gripping portion 20 and a second gripping portion 22, respectively. The "front end" of the gripping tool 10 is the end in which the gripping portions 20 and 22 of the arms 12 and 14 are located, and the "rear end" is the end opposite to the "front end."

When the user presses the arms 12 and 14 toward each other, the distal ends of the arms 12 and 14 are closed. This state is referred to as a closed state. When the pressing on the arms 12 and 14 is cancelled, the distal ends of the arms 12 and 14 return to a state in which they are separated from each other. This state is referred to as an open state. As used herein, the expression that "the arms 12 and 14 are pressed" refers to a state in which the arms 12 and 14 are pressed toward each other, that is, in closing directions.

Figure 5A:
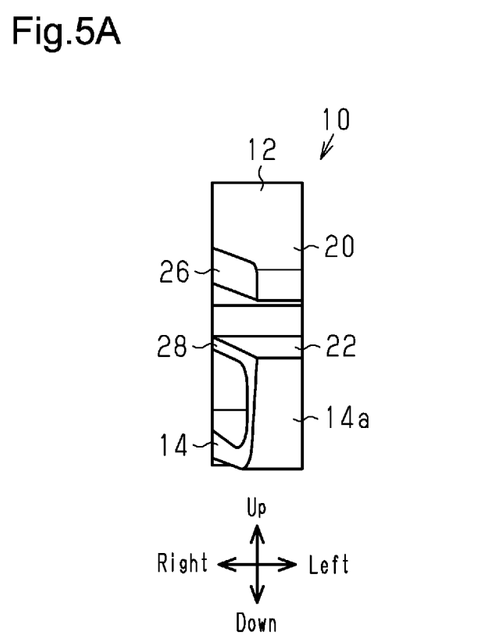
FIG. 5A is a front view of the gripping tool of FIG. 1.
Figure 5B:
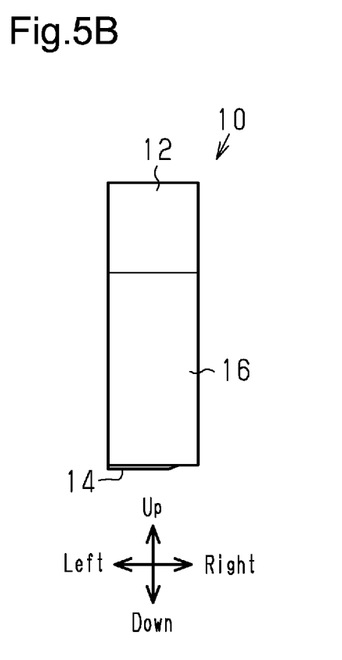
FIG. 5B is a rear view of the gripping tool of FIG. 1.
Figure 6A:
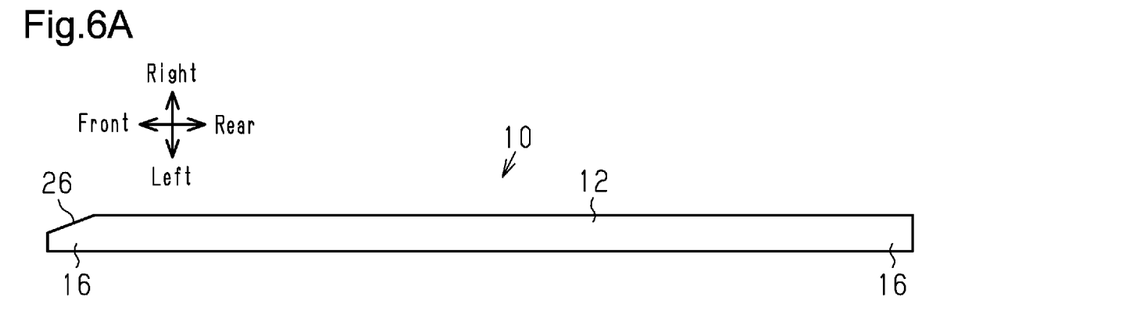
FIG. 6A is a plan view of the gripping tool of FIG. 1.
Figure 6B:
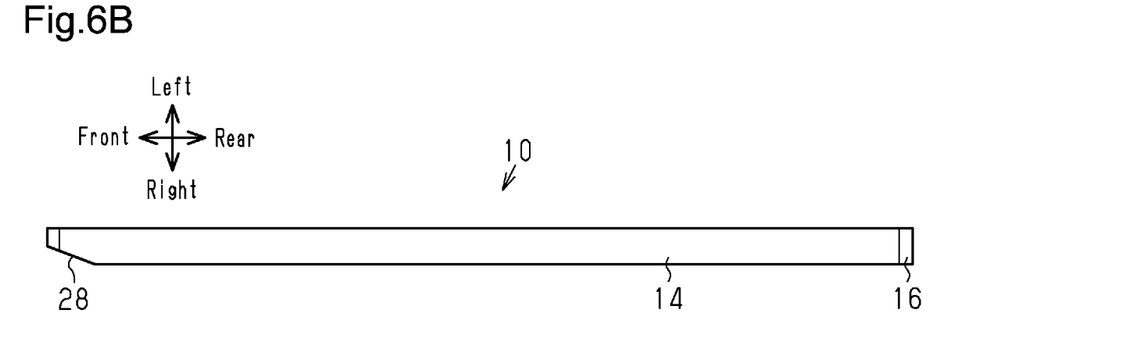
FIG. 6B is a bottom view of the gripping tool of FIG. 1.

As shown in FIGS. 6A and 6B, as viewed in a plan view, the arms 12 and 14 extend linearly and have the same width (the length in the right-left direction) from the proximal end to the distal end. Hereinafter, the length in the right-left direction is simply referred to as the width. As shown in FIGS. 5B, 6A, and 6B, the width of the connecting portion 16 is the same as the width of the arms 12 and 14. The gripping tool 10 may be made of aluminum, for example. The metal gripping tool 10 may be formed through router processing or stamping (not shown). The material of the gripping tool 10 is not limited to metal and may be wood or synthetic resin.

As shown in FIGS. 1, 4A, and 4B, the arm 12 is curved in an arcuate shape such that the center in the longitudinal direction is located farther from the second arm 14. A substantially square wave-shaped groove 30 is defined, at least in an open state, between the first arm 12 and the second arm 14 and between the connecting portion 16 and the distal end. Specifically, the second arm 14 has a second bulging portion 32 defining the groove 30. The second bulging portion 32 extends in a trapezoidal shape toward the first arm 12. The second arm 14 has a trapezoidal stopper 18 defining the groove 30. The stopper 18 is located between the second bulging portion 32 and the distal end.

The first arm 12 has a first bulging portion 34 defining the groove 30. The first bulging portion 34 extends in a trapezoidal shape toward the second arm 14. The first bulging portion 34 is located between the stopper 18 and the second bulging portion 32. The stopper 18 comes into contact with the first arm 12 when the arms 12 and 14 are pressed, thereby stopping the arms 12 and 14 from further coming closer to each other. That is, the stopper 18 sets the amount of movement when the arms 12 and 14 are pressed. The thickness (the dimension in the up-down direction) of the first arm 12 may be uniform except for the first bulging portion 34.

Figure 2:
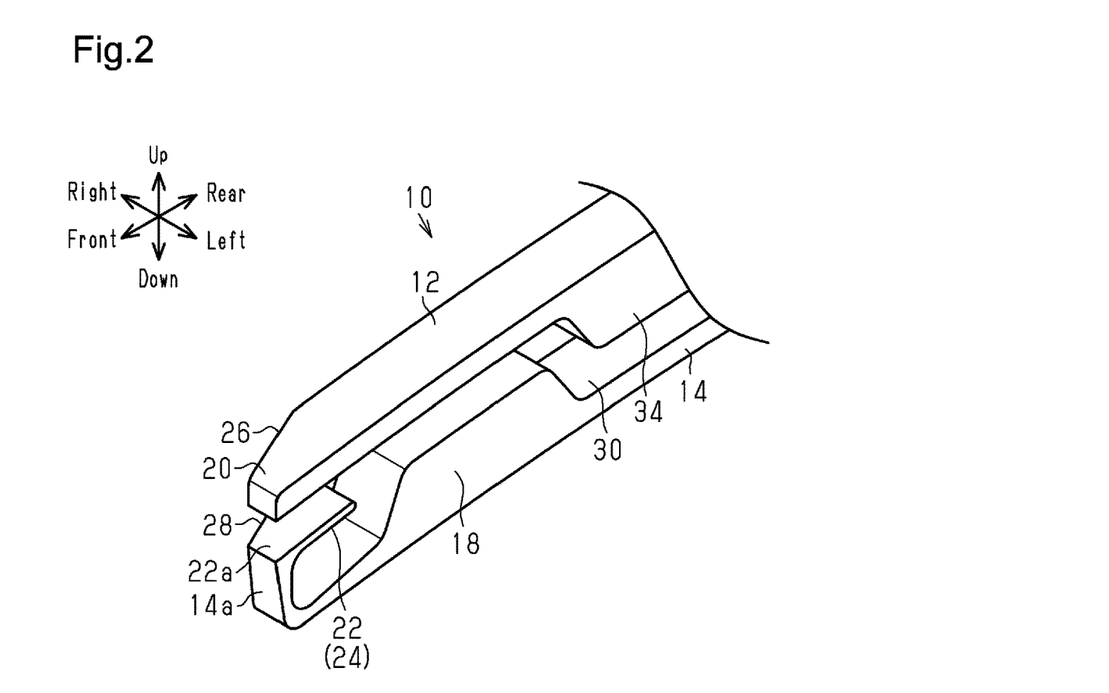
FIG. 2 is a perspective view showing a main part of the gripping tool of FIG. 1.
Figure 3A:
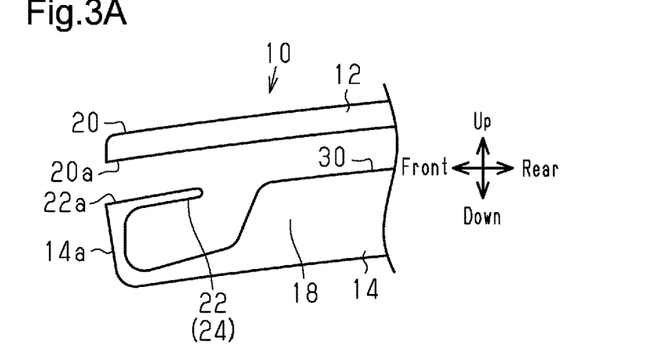
FIGS. 3A to 3C are side views illustrating an operation of the gripping tool of FIG. 1.

As shown in FIGS. 2 and 3A, the first arm 12 has an extension section extending from the first bulging portion 34 to the distal end in a uniform thickness, and the extension section includes the first gripping portion 20. The upper surface (outer surface) of the first arm 12 is a curved surface continuous from the distal end to the proximal end. The lower surface (inner surface) of the extension section is an arcuately curved surface along the outer surface. The inner surface of the first gripping portion 20 serves as a first gripping surface 20a. The first arm 12 has an arcuately curved surface extending from the first bulging portion 34 toward the proximal end. The first gripping surface 20a may be flush with the inner surface of the first arm 12 and have the same radius of curvature as the inner surface of the first arm 12. The radius of curvature of the first gripping surface 20a may differ from that of the inner surface of the first arm 12.

The second arm 14 has a first extension section, which extends between the second bulging portion 32 and the stopper 18, and a second extension section, which extends between the second bulging portion 32 and the connecting portion 16. The first and second extension sections have the same thickness.

As shown in FIGS. 1, 2, 3A to 3C, 4A and 4B, the second arm 14 has an L-shaped bent portion between the stopper 18 and the gripping portion 22. The bent portion includes a section extending forward from the stopper 18 and a section 14a extending upward from the front end of the section. The second gripping portion 22 extends rearward from the upper end of the section 14a. The second gripping portion 22 is formed by an elastic part 24.

The elastic part 24 has a second gripping surface 22a. The second gripping surface 22a is substantially parallel to the first gripping surface 20a. The second gripping surface 22a faces the first gripping surface 20a. The second gripping surface 22a is a curved surface having the same radius of curvature as the first gripping surface 20a. Specifically, the first gripping surface 20a is a curved concave surface, and the second gripping surface 22a is a curved convex surface. The elastic part 24 is thinner than the first gripping portion 20. The gripping portion 20, which is thicker than the elastic part 24, has higher rigidity than the elastic part 24.

Figure 3B:
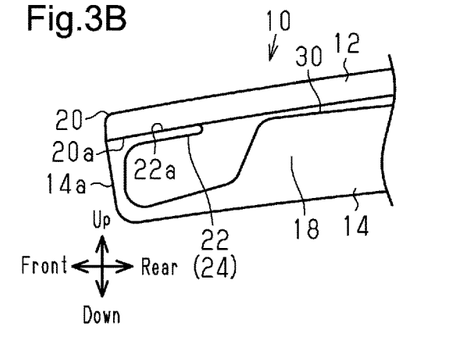

As shown in FIGS. 1, 2, 3A, 4A, and 4B, when the arms 12 and 14 are in an open state, the second gripping surface 22a is spaced apart from the first gripping surface 20a. As shown in FIG. 3B, in an initial closed state, the first gripping surface 20a comes into planar contact with the second gripping surface 22a. A state in which the gripping surfaces 20a and 22a are in planar contact with each other and the constraining force on the gripping object held between the gripping surfaces 20a and 22a is significantly weak is hereinafter referred to as a first closed state. In this state, the gripping surfaces 20a and 22a are parallel to each other.

Figure 3C:
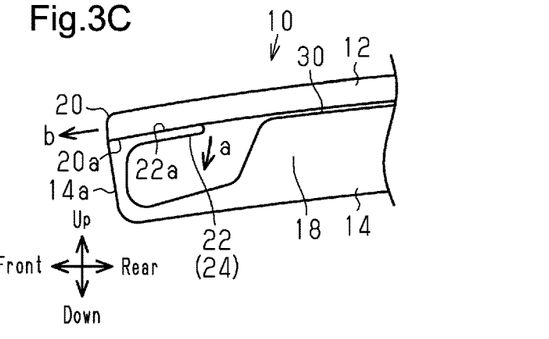

When further pressed from the first closed state shown in FIG. 3B, the arms 12 and 14 are brought into a second closed state shown in FIG. 3C. During this displacement, the elastic part 24 is elastically deformed while maintaining the planar contact between the gripping surfaces 20a and 22a. Specifically, the first arm 12 is deformed so as to have a larger radius of curvature and is slightly moved in the direction of arrow b, but the planar contact between the gripping surfaces 20a and 22a is maintained. That is, the first arm 12 is configured to slide along the second gripping surface 22a and therefore the elastic part 24 when the elastic part 24 is elastically deformed.

In the second closed state shown in FIG. 3C, the elastic part 24 and the first gripping portion 20 receive a greater pressing force than in the first closed state shown in FIG. 3B.

When the state transitions from the first closed state to the second closed state occur, the stopper 18 comes into contact with the inner surface of the first arm 12 thereby stopping the further movement of the arms 12 and 14. The stopper 18 is set to have a size (protruding height) corresponding to a proper moving distance of the arms 12 and 14. The stopper 18 is preferably arranged near the gripping portions 20, 22 or the elastic part 24 so that an excessive pressing force is not applied to the gripping surfaces 20a and 22a and therefore the gripping object held between the gripping surfaces 20a and 22a.

As shown in FIGS. 2, 4B, 5A, and 6B, the gripping portions 20 and 22 have first and second inclined surfaces 26 and 28, respectively, each defined by a cut on one side (for example, on the right side). As a result, the gripping portions 20 and 22 and therefore the gripping surfaces 20a and 22a are tapered.

Operation of Embodiment

An operation of the gripping tool 10 configured as described above is now described.

FIGS. 3A and 4A show the gripping tool 10 in the open state. When the arms 12 and 14 are pressed from this state, the connecting portion 16 is elastically deformed, and the arms 12 and 14 assume the first closed state shown in FIG. 3B. When the pressing is cancelled in this state, the arms 12 and 14 return to the open state of FIGS. 1 and 4A.

In the first closed state, the gripping surfaces 20a and 22a are in planar contact with each other. At this time, the elastic part 24 is not elastically deformed.

As shown in FIG. 3C, when the arms 12 and 14 are further pressed from the first closed state, the first arm 12 is deformed so as to have a greater radius of curvature and press the gripping portion 22, that is, the elastic part 24. The elastic part 24 is pressed by the deforming gripping surface 22a particularly at its rear end and is thus elastically deformed in the direction of arrow a. At this time, the planar contact between the gripping surfaces 20a and 22a is maintained. That is, even if the arms 12 and 14 are further pressed in the closing directions, the planar contact of the gripping surfaces 20a and 22a is maintained.

A situation is now described in which the gripping tool 10 holds a gripping object (not shown) such as a hair. When a hair is held between the gripping portions 20 and 22 in the first closed state, the gripping surfaces 20a and 22a are in a state close to planar contact. The "state close to planar contact" refers to a state in which the gripping surfaces 20a and 22a are not in contact in part due to the presence of the gripping object. In this state, the gripping object receives a weak constraining force. When the arms 12 and 14 are further pressed from the first closed state, the elastic part 24 is elastically deformed. At this time, the gripping surfaces 20a and 22a still hold the gripping object in a state close to planar contact. That is, the front ends or the proximal ends of the gripping surfaces 20a and 22a do not act as a fulcrum point, which would otherwise cause a moment about the fulcrum point.

Accordingly, the gripping surfaces 20a and 22a can sandwich the gripping object with their entire extension in the front-rear direction. This limits the opening between the distal ends of the gripping portions 20 and 22. Moreover, since a load is not concentrated on any particular section of the gripping object, the gripping object held between the gripping portions is unlikely to break.

When deformed to have a greater radius of curvature, the first arm 12 may or may not slide in the direction of arrow b. The gripping surfaces 20*a* and 22*a* maintains a state close to planar contact with respect to the gripping object even when the first arm 12 slides as well as when it does not slide.

As the arms 12 and 14 are further pressed from the first closed state, the groove 30 between the stoppers 18 becomes narrower as shown in FIG. 3C. Then, when the stopper 18 comes into contact with the inner surface of the first arm 12, the further movement of the arms 12 and 14 is stopped.

The present embodiment has the following features.

(1) Of the arms 12 and 14, the gripping portion 22 of the arm 14 is formed by the elastic part 24 extending toward the connecting portion 16. When the arms 12 and 14 are further pressed in the closing directions from a state in which the gripping surfaces 20*a* and 22*a* are in planar contact, the elastic part 24 is elastically deformed while maintaining the planar contact between the gripping surfaces 20*a* and 22*a*.

As a result, when the gripping portions 20 and 22 hold the gripping object, the distal ends of the gripping portions 20 and 22 are unlikely to open, and the gripping object held between the gripping portions 20 and 22 does not break.

(2) The arms 12 and 14 are elastically connected by the connecting portion 16. As such, when the pressing is cancelled, the arms 12 and 14 return from the closed state to the open state.

(3) The first arm 12 is curved in an arcuate shape. When the elastic part 24 is elastically deformed, the first arm 12 slides along the second gripping surface 22*a*. This maintains the planar contact between the gripping surfaces 20*a* and 22*a*. That is, even if the arms 12 and 14 are elastically deformed while holding the gripping object, the gripping surfaces 20*a* and 22*a* are maintained in a state close to planar contact.

(4) The gripping portions 20 and 22 have the inclined surfaces 26 and 28, each defined by an inclined cut on the right side. As a result, it is easy to insert the gripping object between the gripping surfaces 20*a* and 22*a* from the right side of the gripping portions 20 and 22 having the inclined surfaces 26 and 28.

(5) The second arm 14 has the stopper 18. The stopper 18 limits excessive elastic deformation of the arms 12 and 14. This reduces the likelihood that an excessive pressing force is applied to the gripping object held between the gripping surfaces 20*a* and 22*a*.

(6) The gripping surfaces 20*a* and 22*a* are curved surfaces. Since the gripping surface 20*a* in contact with the elastic part 24 slides in a manner conforming to the elastic deformation of the elastic part 24, the planar contact between the gripping surfaces 20*a* and 22*a* is easily maintained.

(7) The gripping tool 10 can also be used for the purposes of plucking thorns or fine fish bones.

Second Embodiment

Figure 7A:
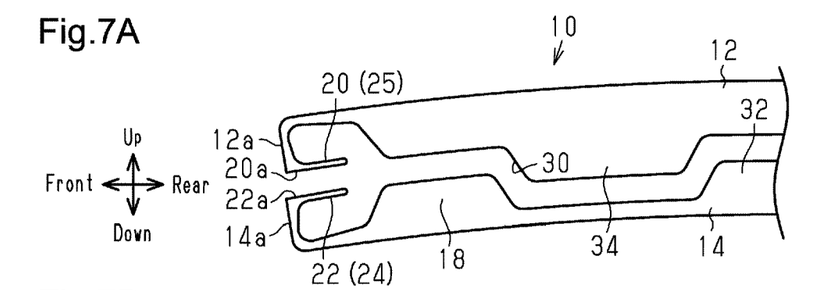
FIGS. 7A to 7C are side views illustrating a gripping tool according to a second embodiment.
Figure 7B:
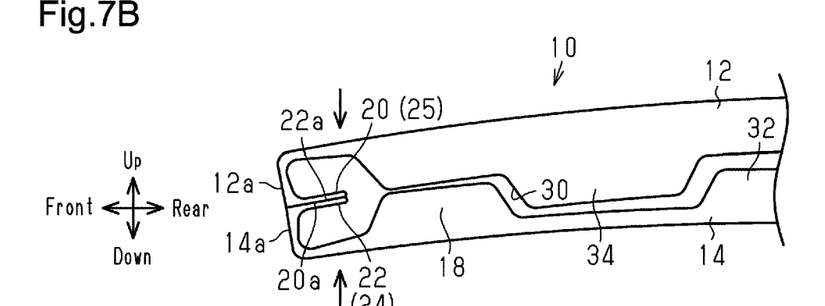
Figure 7C:
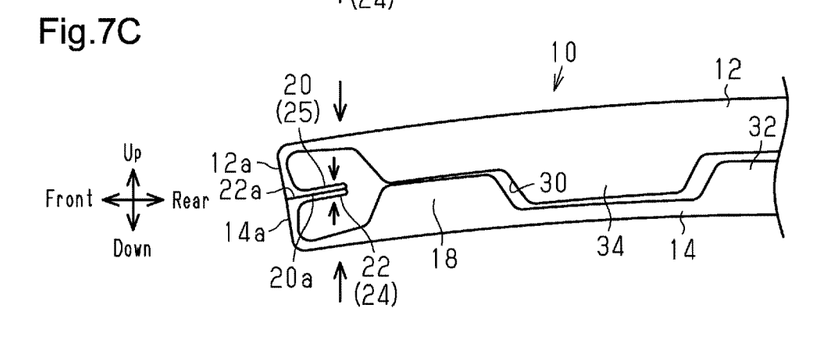

Referring to FIGS. 7A to 7C, a gripping tool 10 of a second embodiment is now described.

The following description mainly focuses on the configurations of the gripping tool 10 of the second embodiment that differ from those of the first embodiment. Same reference numerals are given to the same configurations as those of the first embodiment, and the detailed descriptions thereof are omitted.

As shown in FIG. 7A, the first arm 12 has an L-shaped bent portion at its distal end in the same manner as the second arm 14. The bent portion includes a section extending toward the distal end and a section 12*a* extending downward from the front end of the section. The first gripping portion 20 extends rearward from the lower end of the section 12*a*. The first gripping portion 20 is formed by an elastic part 25.

The elastic part 25 has a first gripping surface 20*a* substantially parallel to the second gripping surface 22*a*. The first gripping surface 20*a* is a curved surface having the same radius of curvature as the second gripping surface 22*a*. Specifically, as in the first embodiment, the first gripping surface 20*a* is a curved concave surface, and the second gripping surface 22*a* is a curved convex surface. The elastic part 25 is thinner than the section of the first arm 12 excluding the bulging portion 34. The elastic part 25 has the same thickness as the elastic part 24. As such, the elastic part 25 has a higher elasticity than the other part of the first arm 12.

As shown in FIG. 7A, when the arms 12 and 14 are in an open state, the first gripping surface 20*a* is spaced apart from the second gripping surface 22*a*. As shown in FIG. 7B, in a first closed state, the first gripping surface 20*a* is in planar contact with the second gripping surface 22*a*. In the first closed state, the gripping surfaces 20*a* and 22*a* are in planar contact with each other, and the constraining force applied to the gripping object held between the gripping surfaces 20*a* and 22*a* is significantly weak. In this state, the gripping surfaces 20*a* and 22*a* are substantially parallel to each other.

When further pressed from the first closed state, the arms 12 and 14 are brought into a second closed state shown in FIG. 7C. In this state, the elastic parts 25 and 24 are elastically deformed while maintaining the planar contact between the gripping surfaces 20*a* and 22*a*. Furthermore, the sections 12*a* and 14*a* are in contact with each other. The gripping surfaces 20*a* and 22*a* extending rearward from the sections 12*a* and 14*a* are in planar contact with each other.

Although not shown, the distal ends of the arms 12 and 14 including the sections 12*a* and 14*a* of the second embodiment each have an inclined surface on the right side. That is, as in the first embodiment, one side of each arm 12, 14 is cut, resulting in a smaller width (the dimension in the right-left direction).

Operation of Second Embodiment

An operation of the second embodiment is now described.

When pressed from the open state shown in FIG. 7A, the arms 12 and 14 are brought into the first closed state shown in FIG. 7B. When the arms 12 and 14 are further pressed in the closing directions from this state, the arms 12 and 14 are elastically deformed as shown in FIG. 7C. The comparison between FIGS. 7B and 7C indicates that this elastic deformation slightly reduces the width of the groove 30, or the clearance, between the arms 12 and 14.

At this time, the L-shaped sections 12*a* and 14*a* in contact with each other receive forces acting away from each other. Although not clearly shown in FIG. 7C, the sections 12*a* and 14*a* in contact with each other may be separated from each other in some cases. Even in those cases, the planar contact between the gripping surfaces 20*a* and 22*a* is maintained. That is, even when the pressing force acting on the gripping surfaces 20a and 22a are increased from the first closed state, the planar contact between the gripping surfaces 20a and 22a is maintained.

When the gripping tool 10 holds a gripping object (not shown) such as a hair, in the first closed state, the gripping surfaces 20a and 22a are in a state close to planar contact. In this state, however, the constraining force applied to the gripping object is weak. When the arms 12 and 14 are further pressed from the first closed state, the elastic parts 24 and 25 are elastically deformed. In this state, the gripping surfaces 20a and 22a still hold the gripping object in a state close to planar contact.

This allows the gripping surfaces 20a and 22a to sandwich the gripping object with their entire extension in the front-rear direction. As such, unlike conventional configurations, the distal ends of the gripping portions 20 and 22 are unlikely to open. Moreover, since a load is not concentrated on any particular section of the gripping object, the gripping object held between the gripping portions is unlikely to break.

The above-described embodiments and the following modifications can be combined as long as the combined modifications remain technically consistent with each other.

The arms 12 and 14 may be bent to form an obtuse angle between the proximal end and the distal end.

As in the conventional example shown in FIG. 8B, a state in which the front ends of the gripping portions 20 and 22 are in contact with each other and the rear ends of the gripping portions 20 and 22 are spaced apart from each other may be defined as a first closed state. In this case, when the arms 12 and 14 are further pressed in the closing directions, the gripping surfaces 20a and 22a come into planar contact with each other as shown in FIG. 3B.

The configuration of the connecting portion 16 may be modified. For example, a shaft may rotationally support the rear ends of the arms 12 and 14, and an elastic member, such as a coil spring, a leaf spring, or a torsion coil spring, may be arranged between the arms 12 and 14. In this case, a stopper for limiting the opening of the arms 12 and 14 is preferably provided to stop the arms 12 and 14 from opening more than necessary.

The arms 12 and 14 may extend linearly.

The arms 12 and 14 do not have to include inclined surfaces. Alternatively, the arms 12 and 14 may have an inclined surface (tapered surface) on each of the right and left sides, or may have an inclined surface only on the left side.

The gripping surfaces 20a and 22a may be flat.

The invention claimed is:

1. A gripping tool comprising:
first and second arms connected to each other at proximal ends thereof;
a first gripping portion at a distal end of the first arm, the first gripping portion having a first gripping surface; and
a second gripping portion at a distal end of the second arm, the second gripping portion having a second gripping surface, wherein
the first and second arms are configured such that the first and second gripping surfaces are in planar contact with each other when the first and second arms are pressed in closing directions toward each other,
at least one of the first and second arms includes a bent portion at a distal end of the at least one of the first and second arms extending toward another of the at least first and second arms,
at least one of the first and second gripping portions is an elastic part extending from the distal end toward the proximal end,
the elastic part includes a fixed end connected to the distal end and a free end opposite to the fixed end in an extending direction of the elastic part, and
the free end of the elastic part is configured to, when the first and second arms are further pressed in the closing directions from a state in which the first and second gripping surfaces are in planar contact with each other, be elastically deformed while maintaining the planar contact between the first gripping surface and the second gripping surface.

2. The gripping tool according to claim 1, wherein the proximal ends of the first and second arms are elastically connected to each other such that, when the pressing on the first and second gripping portions in contact with each other in a closed state is cancelled, the first and second gripping portions return to an open state in which the first and second gripping portions are spaced apart from each other.

3. The gripping tool according to claim 1, wherein
the second gripping portion is the elastic part, and
the first arm is curved in an arcuate shape and configured to slide along the second gripping surface when the elastic part is elastically deformed.

4. The gripping tool according to claim 1, wherein each of the first and second gripping portions has an inclined surface defined by an inclined cut located on one side such that the first and second gripping surfaces are tapered.

5. The gripping tool according to claim 1, wherein at least one of the first and second arms has a stopper configured to set an amount of movement of the arm for a case in which the arm is pressed.

6. The gripping tool according to claim 1, wherein the first and second gripping surfaces are flat or curved surfaces.

7. The gripping tool according to claim 1, wherein the gripping tool is a pair of hair tweezers, a pair of tweezers for thorns, or a pair of tweezers for fine fish bones.

* * * * *